United States Patent
Burrows et al.

(10) Patent No.: US 7,090,314 B2
(45) Date of Patent: * Aug. 15, 2006

(54) LOAD ASSIST MECHANISM FOR AN OVERHEAD BIN

(75) Inventors: Ralph Burrows, Bellingham, WA (US); Joe Frazier, Bellingham, WA (US)

(73) Assignee: Heath Tecna, Inc., Bellingham, WA (US)

( * ) Notice: Subject to any disclaimer, the term of this patent is extended or adjusted under 35 U.S.C. 154(b) by 241 days.

This patent is subject to a terminal disclaimer.

(21) Appl. No.: 10/151,784

(22) Filed: May 20, 2002

(65) Prior Publication Data
US 2002/0175244 A1 Nov. 28, 2002

Related U.S. Application Data

(60) Provisional application No. 60/293,348, filed on May 24, 2001, provisional application No. 60/293,599, filed on May 25, 2001.

(51) Int. Cl.
*A47F 5/08* (2006.01)
*B64D 11/00* (2006.01)
(52) U.S. Cl. .................... 312/246; 244/118.5
(58) Field of Classification Search ........ 312/245, 312/246, 247, 248, 319.2, 319.4, 325, 327, 312/328; 244/118.1, 118.5
See application file for complete search history.

(56) References Cited

U.S. PATENT DOCUMENTS

| 4,275,942 | A | * | 6/1981 | Steidl ..................... 312/266 |
| 5,244,269 | A | * | 9/1993 | Harriehausen et al. ...... 312/247 |
| 5,383,628 | A | * | 1/1995 | Harriehausen et al. ... 244/118.1 |
| 5,441,218 | A | * | 8/1995 | Mueller et al. .......... 244/118.1 |
| 5,456,529 | A | * | 10/1995 | Cheung ..................... 312/245 |
| 5,839,694 | A | * | 11/1998 | Bargull et al. ........... 244/118.1 |
| 5,934,615 | A | * | 8/1999 | Treichler et al. ......... 244/118.5 |
| 6,045,204 | A | * | 4/2000 | Frazier et al. .............. 312/247 |
| 6,484,969 | B1 | * | 11/2002 | Sprenger et al. ......... 244/118.5 |
| 6,691,951 | B1 | * | 2/2004 | Frazier .................... 244/118.1 |
| 2004/0245897 | A1 | * | 12/2004 | Stephan et al. ............. 312/246 |
| 2005/0224643 | A1 | * | 10/2005 | Graf et al. ............... 244/118.1 |

FOREIGN PATENT DOCUMENTS

| DE | 44 46 772 | * | 5/1996 |
| WO | WO 03/033346 | * | 4/2003 |
| WO | WO 03/097457 | * | 11/2003 |

* cited by examiner

Primary Examiner—Janet M. Wilkens
(74) Attorney, Agent, or Firm—Michael F. Hughes; Hughes Law Firm, PLLC

(57) ABSTRACT

A luggage bin assembly (10) adapted to be disposed within a vehicle is provided. The luggage bin assembly includes a bin (14) reciprocally mounted for movement between an opened position and a closed position. The luggage bin assembly also includes a linkage assembly (16) adapted to be hingedly mounted to the bin for swinging movement with the bin as the bin is reciprocated between the open and closed positions. A reciprocating assist mechanism (20) is coupled to the linkage mechanism to selectively apply an assist load to the linkage assembly when the bin is reciprocated between the opened and closed position.

21 Claims, 6 Drawing Sheets

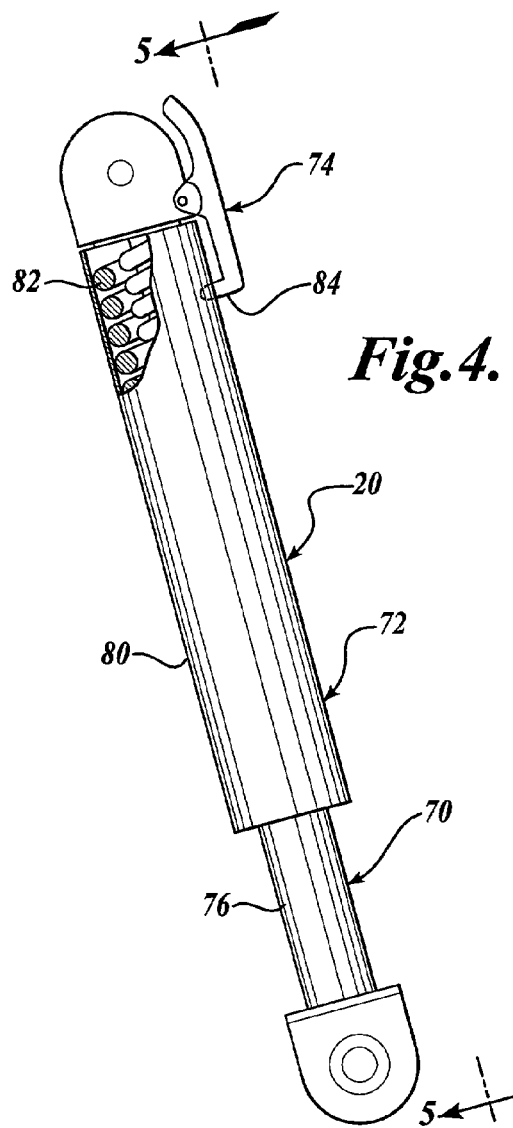
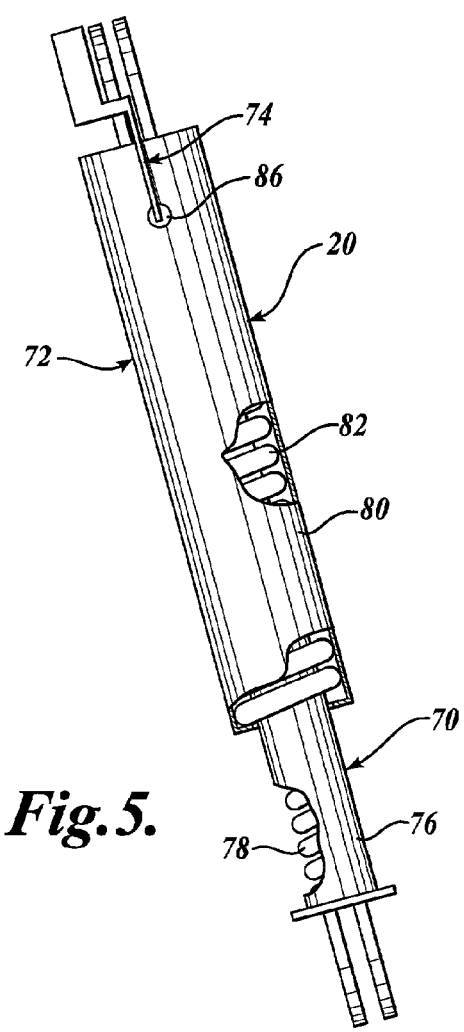
Fig.4.
Fig.5.

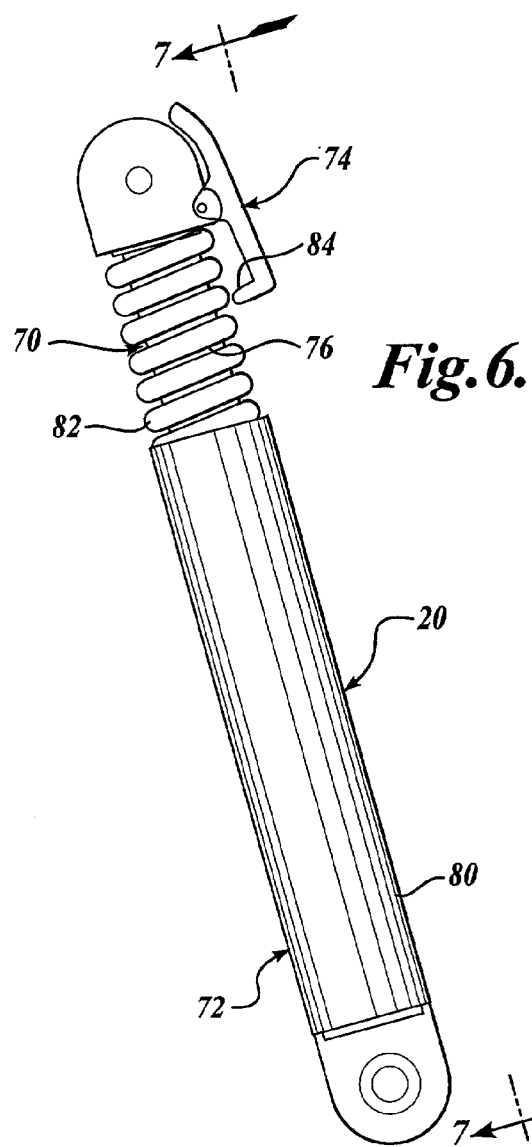
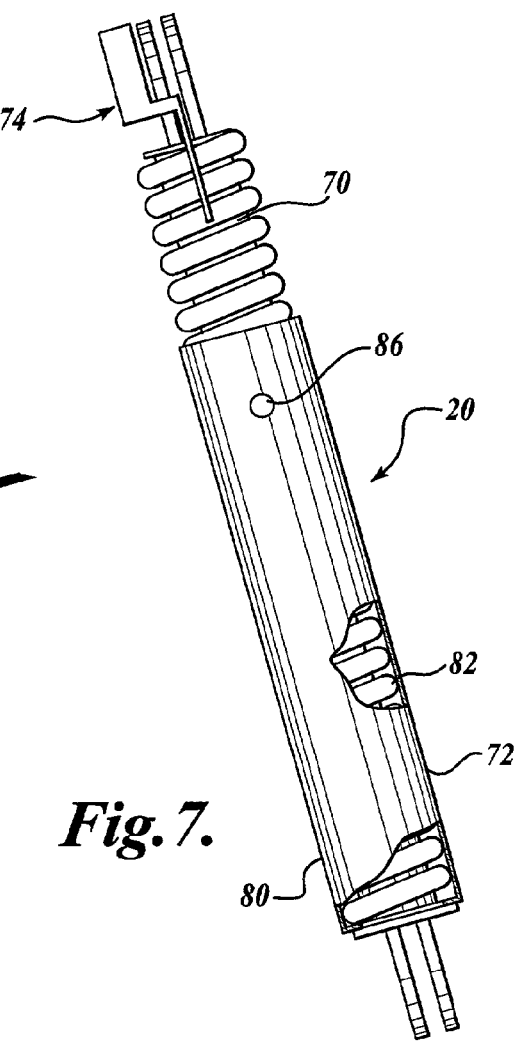

LOAD ASSIST MECHANISM FOR AN OVERHEAD BIN

CROSS-REFERENCES TO RELATED APPLICATIONS

In accordance with 35 U.S.C. § 119(e), this application claims the benefit of U.S. Provisional Patent Application Ser. No. 60/293,348, filed May 24, 2001, and U.S. Provisional Patent Application Ser. No. 60/293,599, filed May 25, 2001, the disclosures of which are both hereby expressly incorporated by reference.

FIELD OF THE INVENTION

This invention relates generally to actuators for vehicle stowage bins and, more particularly, to spring assist actuators.

BACKGROUND OF THE INVENTION

Pull-down bucket stowage bins are commonly used to stow luggage in vehicles having a passenger compartment, such as buses and commercial aircraft. Typically, such stowage bins are reciprocally mounted to or near the ceiling of the passenger compartment, such that they are located above rows of passenger seats within the vehicle. As mounted, the bins may be reciprocated between an open position, where items may be placed within the bin, and a closed positioned to stow items located within the bin. Although overhead stowage bins are effective at stowing items, such as luggage, they are not without their problems.

As an example, a loaded overhead luggage bin of an aircraft may be difficult to push upward into the stowed position due to the weight of the luggage within the bin. This is especially true as it is becoming more common for passengers to carry on heavier luggage. Further, regardless of the weight within the bin, it is desirable to provide such bins with a mechanism that assists in raising the overhead bin into the stowed position.

Therefore, there exists a need for a mechanical actuator for an overhead stowage bin, in which the actuator assists in reciprocating a heavily loaded overhead bin into the closed position, thereby reducing the load required by a passenger to raise the overhead bin into the closed position. Also, this mechanical load-assist actuator must not be activated when the bin is operated in an empty or lightly loaded condition.

SUMMARY OF THE INVENTION

In accordance with one embodiment of the present invention, a luggage bin assembly is provided. The luggage bin assembly generally includes a bin and a linkage assembly. The bin is reciprocally mounted for movement between open and closed positions, and the linkage assembly is hingedly mounted to the bin for swinging movement with the bin as the bin is reciprocated between the opened and closed positions. The luggage bin assembly also includes a reciprocating assist mechanism coupled to the linkage assembly to selectively apply an assist load to the linkage mechanism when the bin is reciprocated between the opened and closed positions.

In accordance with certain aspects of one embodiment of the present invention, the reciprocating assist mechanism is an actuator sized to apply an assist load when a weight disposed within the bin exceeds a predetermined limit. The reciprocating assist mechanism may also include a switch for selective actuation of the reciprocating assist mechanism when the weight disposed within the bin exceeds a predetermined limit.

In accordance with further aspects of one embodiment, the reciprocating assist mechanism includes a first spring in communication with the switch, wherein the switch selectively releases the first spring to apply the assist load.

In accordance with other aspects of one embodiment of the present invention, the linkage assembly includes an upper linkage assembly. The upper linkage assembly includes first and second arms pivotally connected at one end, and a weighing spring extending between adjacent ends of the first and second arms to permit deflection of the second arm relative to the first arm when a weight disposed within the bin exceeds a predetermined limit.

In accordance with still yet other aspects of one embodiment, the second arm is positioned adjacent the switch, such that, when the second arm deflects in response to the load, the second arm pivots the lever to actuate the reciprocating assist mechanism.

BRIEF DESCRIPTION OF THE DRAWINGS

The foregoing aspects and many of the attendant advantages of this invention will become better understood by reference to the following detailed description, when taken in conjunction with the accompanying drawings, wherein:

FIG. 4 is a side planar view of an actuator formed in accordance with one embodiment of the present invention, showing the actuator in the overhead bin's closed position and lightly loaded;

FIG. 5 is a planar view of the actuator of FIG. 4 taken substantially through Section 5—5, with a portion of the actuator cut away to show both an auxiliary spring and a main spring;

FIG. 6 is a side planar view of the actuator of FIG. 4, showing both main and auxiliary spring engagement when a heavy weight is disposed within the overhead stowage bin; and FIG. 7 is a planar view of the actuator of FIG. 6 taken substantially through Section 7—7, showing a portion of the actuator housing cut away for clarity.

DETAILED DESCRIPTION OF THE PREFERRED EMBODIMENT

Figure 1:
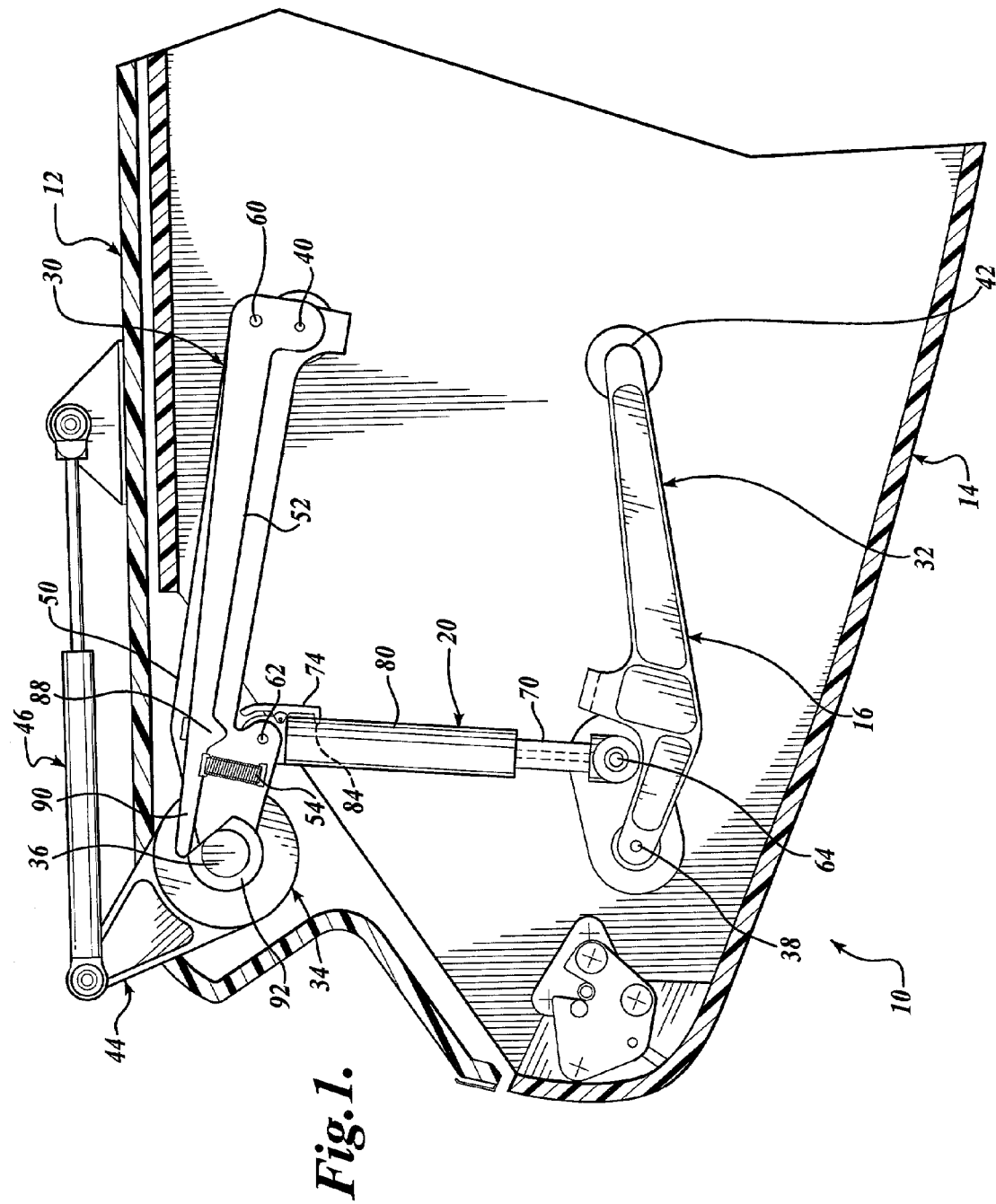
FIG. 1 is a side planar view of an overhead bin having an assist actuator formed in accordance with one embodiment of the present invention, showing the overhead bin in a closed position and lightly loaded.
Figure 2A:
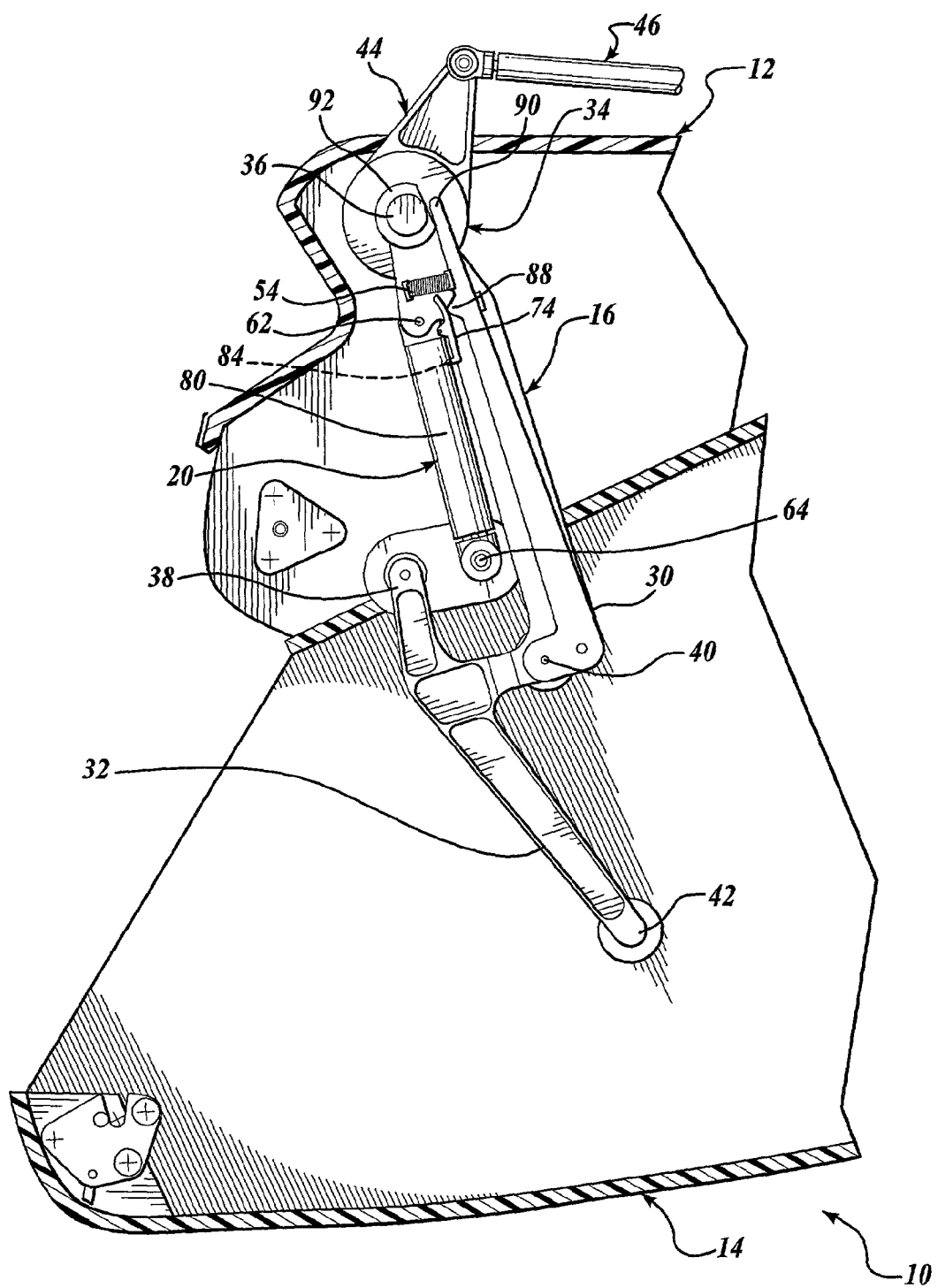
FIG. 2A is a side planar view of the overhead bin assembly of FIG. 1, showing the overhead bin in a fully open position and the bin assembly heavily loaded.
Figure 2B:
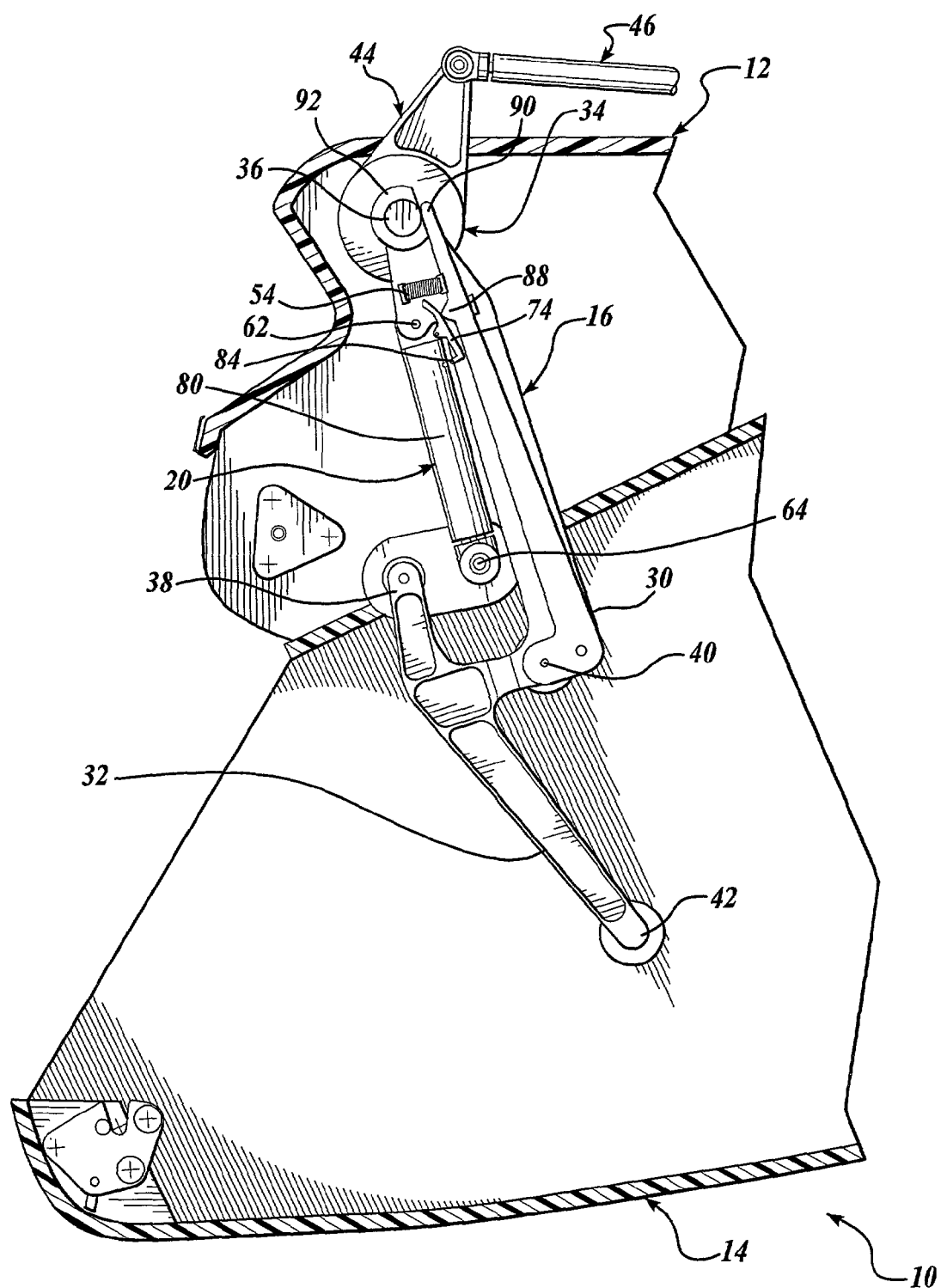
FIG. 2B is a side planar view of the overhead bin assembly of FIG. 1, showing the overhead bin in a partially closed position and the bin assembly heavily loaded.

FIGS. 1–2B illustrate a pull-down stowage bin assembly 10 (hereinafter "bin assembly 10") constructed in accordance with one embodiment of the present invention. The bin assembly 10 includes a housing 12, a bucket assembly 14, linkage assembly 16, and actuator 20. The bucket assembly 14 is connected to the housing 12 by the linkage assembly 16. Although a single linkage assembly 16 is illustrated, it should be apparent that a second, similarly configured linkage assembly (not shown) may be disposed at an opposite end of the bucket assembly 14 to control the operational movement of the bucket assembly 14. Further, either one or both linkage assemblies includes an actuator 20, which is pivotally connected to the upper arm assembly 30 by a pivot pin 62 and the housing 12 by a pivot pin 64. For ease of description, only one linkage assembly will be described in greater detail.

The linkage assembly 16 includes an upper and lower arm assembly 30 and 32. The upper and lower arm assemblies 30 and 32 are suitably pivotally coupled to the side walls of the bucket assembly 14 by pivot pins 40 and 42, respectively, and in a manner well known in the art. Further, the upper arm assemblies 30, at each end of the bucket assembly 14, may be interconnected by a torque tube assembly 34 to ensure that both upper arm assemblies 30 move together, thereby providing coordinated bucket movement through the opening and closing processes.

The upper and lower arm assemblies 30 and 32 are also suitably pivotally connected to the housing 12 by pivot pins 36 and 38, respectively. The rate of bucket opening is controlled by arm 44 which is pivotally attached to a damper 46 secured to the housing 12. The arm 44 can be directly attached to the end of the upper arm assembly 30 or, if a torque tube 34 is used, the arm 44 could be attached directly to the torque tube in a manner well known in the art.

Figure 3B:
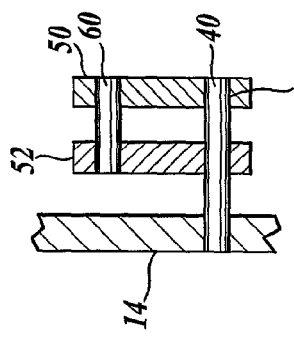
FIG. 3B is a cross-sectional end view of the upper arm assembly of FIG. 3A, taken substantially through Section 3B—3B of FIG. 3A.
Figure 3A:
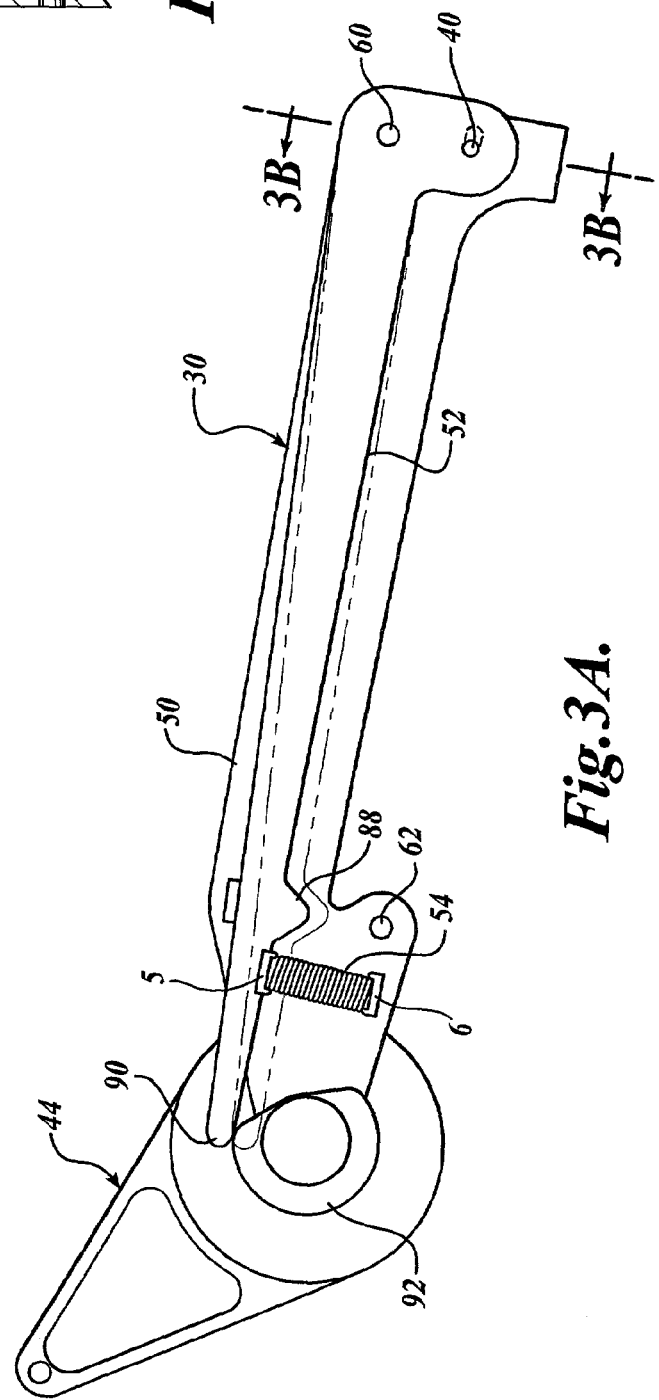
FIG. 3A is a side planar view of an upper arm assembly for an overhead bin formed in accordance with one embodiment of the present invention.
Figure 3C:
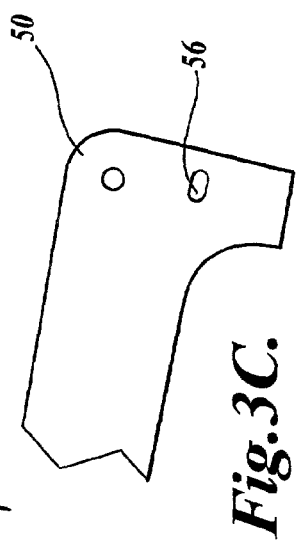
FIG. 3C is a partial side planar view of the upper arm assembly of FIG. 3A with a portion of the upper arm assembly removed for clarity.

Referring now to FIGS. 3A–3C, the upper arm assembly 30 will now be described in greater detail. The upper arm assembly 30 includes an upper arm 50, a weighing arm 52 and a weighing spring 54. The upper arm 50 is a substantially C-shaped member that includes a slot 56 (FIG. 3C) extending parallel to the longitudinal direction of the upper arm 50. The slot 56 provides for slight longitudinal movement of the bucket assembly 14 during heavy loading, thereby forcing movement of weighing arm 52.

Movement of the weighing arm 52 is induced when there is a predetermined weight placed in the bin. As seen best by referring to FIG. 3B, the pivot pin 40 is secured to the bucket assembly 14 and the pin 40 protrudes through both the weighing arm 52 and the slot 56 in the upper arm 50. The predetermined weight disposed within the bin causes the pivot pin 40 to move downward in the slot 56, thereby producing a rotational force in the weighing arm 52 which, in turn, activates switch 74 when the bin is in motion, as is described in greater detail below.

The foregoing movement of the weighing arm 52 occurs only after predetermined movement of the bucket assembly 14 toward the closed position. Specifically, when the bucket assembly 14 is in the fully open position, the actuator 20 is not activated. This prevents the actuator 20 from applying an assist load to the bucket assembly 14 if the weight within the bucket assembly 14 is either removed or is below a predetermined limit, thereby minimizing the risk of the actuator 20 applying an unnecessary assist load to a lightly loaded or empty bin. As used within this description, an "assist load" is intended to mean a secondary load provided by the actuator 20 when the bucket assembly 14 is loaded with a weight that exceeds the predetermined weight limit. Such an assist load aids in the closing of the bucket assembly 14 because it provides an additional load that urges a heavily loaded bucket assembly 14 into the closed position. Further, such an assist load aids in opening a heavily loaded bucket assembly 14 because it resists rapid opening of the bucket assembly 14 due to the weight disposed therein.

Thus, an actuator 20 formed in accordance with the present embodiment provides both a primary closing load, where the actuator 20 urges the bucket assembly 20 toward the closed position, regardless of the weight within the bucket assembly 14, and an assist load.

The weighing arm 52 is suitably an L-shaped member and pivots on the upper arm 50 at pivot pin 60. As seen best by referring to FIG. 3A, the weighing arm 52 is pivotable between a loaded position (shown in phantom) and an unloaded position. In the loaded position, the weighing arm 52 contacts a portion of the actuator 20 to apply an assist load to the linkage assembly 16 as the bucket assembly 14 is reciprocated between the open and closed positions, as is described in greater detail below.

The weighing spring 54 extends between a protrusion 5 on the weighing arm 52 and a corresponding lug 6 on the upper arm 50. The weighing spring 54 limits movement of the weighing arm 52 and biases the weighing arm 52 into the unloaded position. As described in detail below, the weighing spring 54 is selectively compressed by the weighing arm 52 to activate the switch 74 when the weight placed in the bin bucket assembly 14 exceeds a predetermined limit.

Referring now to FIGS. 4–7, the actuator 20 will now be described in greater detail. The actuator 20 includes a main spring assembly 70, an auxiliary spring assembly 72, and a switch 74. The main spring assembly 70 includes a spring housing 76 and a coil compression spring 78 disposed within the spring housing 76. The main spring assembly 70 is coaxially received and extends within the auxiliary spring assembly 72. As described above, the main spring assembly 70 provides the primary closing load.

The auxiliary spring assembly 72 selectively provides the assist load and includes a spring housing 80 and a spring 82. The switch 74 is pivotally connected to the actuator 20 and is spring loaded (not shown) toward an actuator-locked position. One end of the switch 74 is angled to form a hook 84. The hook 84 is adapted and positioned to be selectively and releasably received within a bore 86 extending through the spring housing 80, thus, securing the auxiliary spring assembly 72 in a compressed condition. Although the switch 74 is suitably a hook engaging in a bore 86, other types of switches, such as a hook engaging on a recessed circumferential groove or protruding flange on the auxiliary spring assembly 72, are also within the scope of the present invention.

Operation of the actuator 20 may be best understood by referring to FIGS. 1–2B. Actuation of the auxiliary spring assembly 72 is accomplished through the switch 74, which is operated when the bucket assembly 14 is heavily loaded and is moved from the fully opened or closed position. As a non-limiting example, and best seen in FIG. 2B, the actuator 20 is actuated when the bin has been rotated approximately 10° from the fully open position towards the closed position. Although it is preferred that the actuator 20 assists in both opening and closing of the bucket assembly 14, other types of actuators, such as one that assists only in the closing or opening of the bucket assembly, are also within the scope of the present invention.

As noted above, actuation of the auxiliary spring assembly 72 is triggered when a weight disposed within the bucket assembly 14 exceeds a predetermined weight limit. Within the meaning of this disclosure, a "predetermined weight limit" can vary according to the size and type of bucket assembly. Accordingly, the magnitude of the weight limit will vary and is dependent upon various factors, including the type of vehicle in which the bin assembly is mounted, the type of materials disposed within the bin assembly, and related considerations. As a non-limiting example, for a bin assembly disposed within the fuselage of an aircraft, the predetermined weight limit that must be exceeded before the actuator 20 is actuated is ten (10) pounds. Although ten (10) pounds is cited as a non-limiting example, it should be apparent that a lesser or greater weight limit is also within the scope of the present invention.

As the bucket assembly 14 loaded weight is increased, the weighing arm 52 translates within the slot 56 of the upper arm 50. As the weighing arm 52 translates, the weighing spring 54 is compressed until a portion of the weighing arm 52 activates the switch 74. Specifically, the weighing arm 52 includes a cam surface 88 extending from one side of the weighing arm 52. As seen in FIG. 2B, the cam surface 88 depresses the switch 74 when the weight in the bucket assembly 14 exceeds the predetermined weight limit and the bucket assembly 14 is between the fully open and closed positions.

This action causes the switch 74 to pivot, thereby rotating the hook 84 from within the bore 86 of the spring housing 80. As a result, the auxiliary spring assembly 72 applies more closing force when the bucket is displaced into the closed position and offsets heavy bucket loading weight. Thus, the actuator 20 applies an assist load when the bucket assembly 14 is reciprocated between the open and closed positions.

The switch 74 re-engages the bore 86 when the bucket assembly 14 is in the fully opened position (FIG. 2A). As noted above, if the bucket assembly 14 is empty or is lightly loaded, i.e., includes a weight that is below the predetermined weight limit, then the switch 74 remains engaged within the bore 86 when the bucket assembly 14 is returned to the closed position (FIG. 1). If, however, the bucket assembly 14 is heavily loaded, i.e., includes a weight greater than the predetermined weight limit, then the switch 74 is disengaged from within the bore 86 when the bucket assembly 14 is returned to the closed position (FIGS. 6 and 7). As configured, the actuator 20 does not provide an assist load when the bucket assembly 14 is reciprocated between the open and closed positions and the bucket assembly 14 is empty or lightly loaded, but does provide such an assist load when the bucket assembly 14 is heavily loaded.

As shown in FIG. 3A, when the bucket assembly 14 is returned to the fully open position, the weighing arm 52 is returned to the nominal position by one end 90 of the weighing arm 52 riding on a cam surface 92, which is attached to the housing 12. During a subsequent closing of a heavily loaded bucket assembly 14, the auxiliary spring assembly 72 is activated when the end 90 of the weighing arm 52 leaves the cam surface 92, thus providing a mechanical acceleration restraint and ease of opening and closing the bucket assembly 14. Movement of the weighing arm 52 is resisted when the bucket assembly 14 is in the fully opened and closed positions because the end 90 of the weighing arm 52 is resting on the cam 92. The open bucket is retained in the open position by an over center location of the actuator 20 and alignment of the pivot pins 36, 62, and 64.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A luggage bin assembly adapted to be disposed within a vehicle, the luggage bin assembly comprising:
    a) a bin reciprocally mounted for movement between an open position and a closed position;
    b) a linkage assembly hingedly mounted to the bin for swinging movement with the bin as the bin is reciprocated between the opened and closed positions; and
    c) a reciprocating assist mechanism coupled to the linkage assembly to selectively apply an assist load to the linkage assembly when the bin is reciprocated between either the opened and/or closed position, said reciprocating assist mechanism being an actuator sized to apply the assist load when a weight disposed within the bin exceeds a predetermined limit.

2. A luggage bin assembly adapted to be disposed within a vehicle, the luggage bin assembly comprising:
    a) a bin assembly reciprocally mounted for reciprocating movement between opened and closed positions;
    b) upper and lower linkage assemblies pivotably connected to the bin assembly; and
    c) an actuator extending between the upper and lower linkage assemblies to selectively assist in reciprocating the bin assembly between the open and closed positions by applying an assist load to the bin assembly when the bin assembly is reciprocated between the opened and closed positions, said actuator comprising:
        i. a housing;
        ii. a switch coupled to the housing; and
        iii. a first spring disposed within the housing and in communication with the switch for selective actuation of the actuator when a weight disposed within the bin assembly exceeds a predetermined limit.

3. The luggage bin assembly of claim 2, wherein the actuator further comprises a second spring disposed within the housing.

4. The luggage bin assembly of claim 2, wherein the switch of the actuator comprises a switch means for selective actuation of the actuator when a weight disposed within the bin assembly exceeds a predetermined limit.

5. The luggage bin assembly of claim 4, wherein the switch means is a lever pivotably connected to a portion of the actuator.

6. The luggage bin assembly of claim 5, wherein one end of the lever is positioned for selective engagement with a portion of the upper linkage assembly to pivot the lever and actuate the actuator when the weight disposed within the bin assembly exceeds the predetermined limit.

7. The luggage bin assembly of claim 5, wherein the upper linkage assembly comprises:
    a) first and second arms pivotably connected at one end; and
    b) a weighing spring extending between adjacent ends of the first and second arms to permit deflection of the second arm relative to the first arm when the weight disposed in the bin assembly exceeds the predetermined limit.

8. The luggage bin assembly of claim 7, wherein the second arm is positioned adjacent the lever, such that when the second arm deflects in response to the weight, the second arm pivots the lever to actuate the actuator.

9. A luggage bin assembly adapted to be disposed within a vehicle, the luggage bin assembly comprising:
    a) a bin swingingly coupled for reciprocating movement between an opened position, where a weight may be disposed within the bin, and a closed position;

b) attachment means connected to the bin for reciprocating the bin between the opened and closed positions; and c) load assist means coupled to the attachment means and actuatable to selectively apply an assist force to the attachment means when the weight in the bin exceeds a predetermined limit.

10. The luggage bin assembly of claim 9, further comprising switch means coupled to the load assist means for selectively actuating the load assist means when the weight exceeds a predetermined limit.

11. A luggage bin assembly adapted to be disposed within a vehicle, the luggage bin assembly comprising:
a) a bin mounted for reciprocating movement between an opened position, where a weight may be disposed within the bin assembly, and a closed position;
b) upper and lower linkage assemblies pivotably connected to the bin assembly; and
c) a spring actuator extending between the upper and lower linkage assemblies to selectively assist in reciprocating the bin assembly when the weight in the bin assembly exceeds a predetermined limit.

12. The luggage bin assembly of claim 11, wherein the spring actuator comprises a housing and a switch pivotably coupled to the housing.

13. The luggage bin assembly of claim 12, wherein the upper linkage assembly comprising:
a) first and second arms pivotably connected at one end; and
b) a weighing spring extending between adjacent ends of the first and second arms to permit deflection of the second arm relative to the first arm when the weight disposed in the bin assembly exceeds a predetermined limit.

14. The luggage bin assembly of claim 13, wherein the second arm is positioned adjacent the switch, such that when the second arm deflects in response to the weight, the second arm pivots the switch to actuate the spring actuator.

15. A luggage bin assembly adapted to be disposed within a vehicle, the luggage bin assembly comprising:
a) a bin assembly mounted for reciprocating movement between an opened position, where a weight may be disposed within the bin assembly, and a closed position;
b) a linkage assembly pivotably connected to the bin assembly; and c) a dual spring actuator coupled to the linkage assembly to selectively assist in reciprocating the bin assembly when the weight in the bin assembly exceeds a predetermined limit.

16. The luggage bin assembly of claim 15, wherein the linkage assembly comprises first and second arms hingedly coupled at the first end, and a weighing spring extending between adjacent ends of the first and second arms.

17. The luggage bin assembly of claim 16, wherein the dual spring actuator comprises a switch to selectively actuate the dual spring actuator.

18. The luggage bin assembly of claim 17, wherein the weighing spring permits deflection of the second arm relative to the first arm when the weight in the bin assembly exceeds the predetermined limit, such that the second arm triggers the switch to selectively actuate the dual spring actuator.

19. A luggage bin assembly adapted to be disposed within a vehicle, the luggage bin assembly comprising:
a) a bin reciprocally mounted for movement between an open position and a closed position;
b) a linkage assembly hingedly mounted to the bin for swinging movement with the bin as the bin is reciprocated between the opened and closed positions; and
c) a reciprocating assist mechanism coupled to the linkage assembly to selectively apply an assist load to the linkage assembly when the bin is reciprocated between either the opened and/or closed position, said reciprocating assist mechanism comprising a switch for selective actuation of the reciprocating assist mechanism when a weight disposed within the bin exceeds a predetermined limit.

20. The luggage bin assembly of claim 19, wherein the reciprocating assist mechanism further comprises a first spring in communication with the switch, wherein the switch selectively releases the first spring to apply to the assist load.

21. The luggage bin assembly of claim 20, wherein the reciprocating assist mechanism further comprises a second spring.

* * * * *